(12) United States Patent
Weg (10) Patent No.: US 7,451,795 B2
(45) Date of Patent: Nov. 18, 2008

(54) SYSTEM FOR SEPARATING AND LINKING COMPOSITE FIBERS

(75) Inventor: Johannes Weg, Dillenburg (DE)

(73) Assignee: EHA Spezialmaschinenbau GmbH, Steffenberg (DE)

( * ) Notice: Subject to any disclaimer, the term of this patent is extended or adjusted under 35 U.S.C. 154(b) by 455 days.

(21) Appl. No.: 11/107,778

(22) Filed: Apr. 18, 2005

(65) Prior Publication Data

US 2005/0184188 A1    Aug. 25, 2005

Related U.S. Application Data

(63) Continuation of application No. PCT/EP02/11588, filed on Oct. 17, 2002.

(51) Int. Cl.
*B65H 81/00*    (2006.01)

(52) U.S. Cl. .................. 156/425; 156/430; 156/441

(58) Field of Classification Search .................. 156/166, 156/169, 173, 175, 425, 430, 441, 573, 523
See application file for complete search history.

(56) References Cited

U.S. PATENT DOCUMENTS 3,148,102 A * 9/1964 Eakins et al. ............... 156/161
4,790,898 A * 12/1988 Woods ....................... 156/166
5,290,389 A * 3/1994 Shupe et al. ................ 156/425
2001/0028015 A1    10/2001 Yasui et al.

FOREIGN PATENT DOCUMENTS

| DE | 198 11 397 C1 | 11/1999 |
| EP | 0 145 878 A2 | 6/1985 |
| JP | 7-69539 A | 3/1995 |

\* cited by examiner

*Primary Examiner*—Jeff H Aftergut
(74) *Attorney, Agent, or Firm*—Clark & Brody (57) ABSTRACT

A system and process for separating and linking composite fibers, fiber bundles and the like in a filament winding installation (10) for the manufacture of rotationally symmetric wound packages (70) has a feeding device (11) for a fiber strand (12) impregnated with a matrix material which is wound on a rotatably driven base element (20). The system has at least one separating device (30) for cutting the fiber strand (12) and contacting the package-sided end (13) of the fiber strand (12) on the completed wound package (70). Also provided is at least one binding device (50) for linking the free end (14) of the fiber strand (12) with an adjacent new non-wound base element (20).

12 Claims, 10 Drawing Sheets

SYSTEM FOR SEPARATING AND LINKING COMPOSITE FIBERS

CROSS-REFERENCE TO RELATED APPLICATIONS

This application is a continuation of PCT/EP2002/011588 filed Oct. 17, 2002. This PCT application was not in English as published under PCT Article 21(2).

FIELD OF INVENTION

The present invention concerns a system for separating and linking composite fibers, fiber bundles and the like in a filament winding installation for the manufacture of rotationally symmetric wound packages.

BACKGROUND OF THE INVENTION

In a filament winding process, fiber strands are impregnated with resin and subsequently wound on a shaped support which may be a mandrel or a base element (liner), e. g. a plastic vessel. Once the winding operation is completed and the resin is cured, the shaped support is either removed from the wound package or it remains in place and becomes part of the wound package. Normally, winding is realized according to a predetermined pattern which is executed by means of a CNC control unit. The fiber strands generally consist of a plurality of filaments, e. g. of 1,000 to 12,000 fine fibers which are gathered into rovings, i. e. fiber bundles, or into tapes and flat bands, respectively, having a titer of 1,000 tex and more.

Before the production of a wound package is started, a fiber strand is positioned on the mandrel or the base element, respectively. After winding, the fibers must be cut and made as even with the surface of the product as possible. Up to now, the fibers have been manually stuck on the mandrel or the liner prior to the start of manufacture. They have also been manually cut and made even with the surface of the wound package after completion of the winding operation. Cutting is necessary to allow for the release of the completed wound package from the installation and its delivery. To allow a fiber strand (roving or flat band) to be wound on the next form, it has to be linked with that new base element.

It is a known procedure following the production of a wound package to wind a fiber strand from the latter onto an intermediate carrier in form of an adjacent tube. The fibers of the strand are fixed on said tube, and the fibers which connect it with the mandrel are cut by means of a blade. After the removal of the completed wound mandrel and the insertion of a new, non-wound mandrel, the fibers of the intermediate carrier are wound onto the mandrel. However, there is the disadvantage that the usual cutting and binding technique does not allow for a fully automated production using the filament winding process.

To wind tennis racket frames, a portal machine with a lathe has been used whose central spindle drive actuates a mandrel supported in a jewelled bearing on the left and right sides each. A fiber strand from a spool creel each is guided through an associated impregnation bath to a traversing arm. The portal is provided with a travelling drive alternately actuating one traversing arm and then the other to allow the respective fiber strand to be wound on one mandrel or the other. Once the winding operation on the first mandrel is terminated, the fiber strand is wound along the mandrel and brought into a parking position proximate to the spindle box. The controlled drive releases the current traversing arm and travels to the other side to actuate the second traversing arm. The result is an accumulation of wound roving ends in the respective parking position—which requires manual interventions to avoid long stops—and consequently the premature hardening of the resin, with the manual interventions impeding in turn a continuous operation. The expenditures for mechanical equipment are considerable because all components except the main drive and the common drive for the traversing arms are required in duplicates.

SUMMARY OF THE INVENTION

It is an object of the present invention to avoid these and further drawbacks of the prior art and to develop a system with a cost-efficient structure for separating and linking composite fibers, fiber bundles and the like in a filament winding process that is easy to use and allows for a fully automated serial production. An aim is the creation of plants having few single components, in particular an automated separating and binding unit for winding operations in which the individual strands are impregnated with a matrix material. They should allow for continuous operation during 23 hours per day with e. g. eight resin-impregnated fiber strands (rovings, bands, tapes) measuring 1,200 tex each.

According to the present invention, a system for separating and linking composite fibers, fiber bundles and the like in a filament winding installation for the manufacture of rotationally symmetric wound packages, provided with a feeding device for a resin-impregnated fiber strand to be wound on a rotationally symmetric base element driven in rotation is characterized in that it comprises at least one separating device for cutting the fiber strand and applying the wound package-sided end of the fiber strand on a completed wound package, and at least one binding device to link the free end of the fiber strand with an adjacent new and non-wound base element. The structure is of simple design and avoids double expenditures of usual systems which inevitably require pairs of impregnation baths, spool creels, traversing arms and the like because of the need to leave the rovings always on one side of the spindle drive. According to the invention, there is no intermediate carrier such as a tube required, since with the new system, which is particularly suited for the mass production of pressure vessels, the fiber strand is directly fixed and cut on the product, and its thus obtained free end is automatically linked with the next base element.

Generally, said system is used in a filament winding installation with a CNC controlled lathe, preferably provided with multiple spindles and realized either as a column machine or a portal machine, and having an impregnation bath for the fiber strand that is fed from a spool creel and that may consist of glass fibers, carbon fibers, polyester fibers, aramid fibers, cotton fibers or hybrids. Typical impregnation substances are unsaturated polyester resins, polyesterimid resins or polyimid resins, and also epoxide resins, silicone resins and melamine resins. Further components are additives, fillers and pigments, activators and stabilizers. The base element may be a blow-moulded plastic vessel and the final product may be a wound hollow body, for example a pressure cylinder for liquefied gas or a transparent tank for liquids such as fuel oil, the fill level being freely shown.

In another embodiment, the separating device comprises at least one cutting device, such as a fixed blade or a knife provided with a drive, and it can also comprise at least one elastic stripper, e.g. by way of a rubber lip or plastic lip that is moved on the wound package periphery, advantageously more or less perpendicular relative to the cutting direction of the cutting device. The production flow will become easier and faster if the movements of the cutting device and the stripper are synchronously coupled with the movement of the wound package.

An important embodiment of the system provides that the separating device and the binding device are adapted to be moved into the working zone of the filament winding installation and be removed therefrom by pivoting. Thus the working zone can be cleared or be used to reroute the feeding of the fiber strands, if necessary. In fact, that can be done in a particularly simple way if these devices form modules. However, the binding device may also be connected with the separating device so as to allow pivoting whereby there is even more freedom of applicability.

Conveniently, the binding device comprises at least one further elastic stripper, e.g. by way of a rubber lip or plastic lip, moved over the peripheral side of the base element. Further, the movement of the binding device is synchronously coupled with the movement of the base element.

A simplified structure uses a binding and cutting device without holding devices. Once the fibers are cut, they are immediately positioned on a new, non-wound element and pressed against it in the direction of the fibers. However, there may be auxiliary fixing devices provided to maintain and or fix the fiber strand in the right position before the cutting step. The fixing device can be preferably suited to be swung into and out of the working zone of the filament winding installation, and it may form a module if combined with the separating device and/or the binding device.

In a process for separating and linking composite fibers using the filament winding technique, at least one fiber strand which is preferably impregnated with a matrix material is wound on a rotationally symmetrical base element driven in rotation and is then cut by means of a separating device. Subsequently, the cut fibers of the completed wound package are fixed on the latter, and the remaining fiber strand is passed to an adjacent new base element to which its free end is linked. It is a substantial advantage of the present invention that no auxiliary means such as a tube is required, as was the case with conventional systems. The rovings and/or tapes are directly fixed and cut on the product. After changing the support (mandrel or liner), the filament is automatically positioned on the next product and is wound.

The winding operation continues until the previously programmed coverage of the base element by the resin-impregnated fibers is reached. Therefore, the installation can be operated in a very efficient way, particularly as the downtime is reduced to a minimum period required for maintenance purposes. That aspect in turn is important because of the quick hardening of the resin. Longer downtimes would disrupt the whole production.

The package-sided end of the cut fiber strand is conveniently spread on the completed wound package in the direction of the fibers and/or in winding direction, e.g. by means of a spreading knife, a stripper, or the like. The completed wound package may be rotated by a defined angle in winding direction while the cut fibers are positioned and spread on it.

The free end of the fiber strand is attached to the periphery of the base element, and advantageously with the free end of the fiber strand being positioned on the base element opposed to the winding direction of the latter. The base element can be rotated by a defined angle opposed to the winding direction while the fiber strand is positioned on it. It is particularly convenient if, for linking the free end of the fiber strand, the base element receives a full turn without preliminary tension.

An important embodiment is defined wherein the fiber strand is spread on the base element along geodetic lines. Such lines being the shortest way between two points on curved surfaces, winding can be much economized. The fibers are moreover prevented from slipping off the wound package since all external forces of the fibers act perpendicularly to its surface.

The binding of the fiber strand is realized in a very easy manner proximate to polar caps of the base element, particularly if the free end of the fiber strand is fixed by the binding device on the arbor or hub of the base element.

It is possible to use a binding and cutting device without holding device, with the fibers of the free end of the fiber strand being positioned immediately after the cutting operation on a new, non-wound body and pressed against it in the direction of the fibers. However, an auxiliary fixing device for picking up the fiber strand before the cutting operation and for fixing it in cutting position can be provided. In a special embodiment, a continuous fiber strand can be picked up under continuous fiber tension, be cut on a completed wound package and be linked with an adjacent new base element by a combined separating and binding unit.

BRIEF DESCRIPTION OF THE DRAWINGS

Further features, details and advantages of the invention will be evident from the wording of the claims and the following description of embodiments by way of the drawings. It is expressly declared that any identification references and arrows indicating directions of movement contained therein are integral parts of the description. The drawings show:

DETAILED DESCRIPTION OF THE INVENTION

Figure 1:
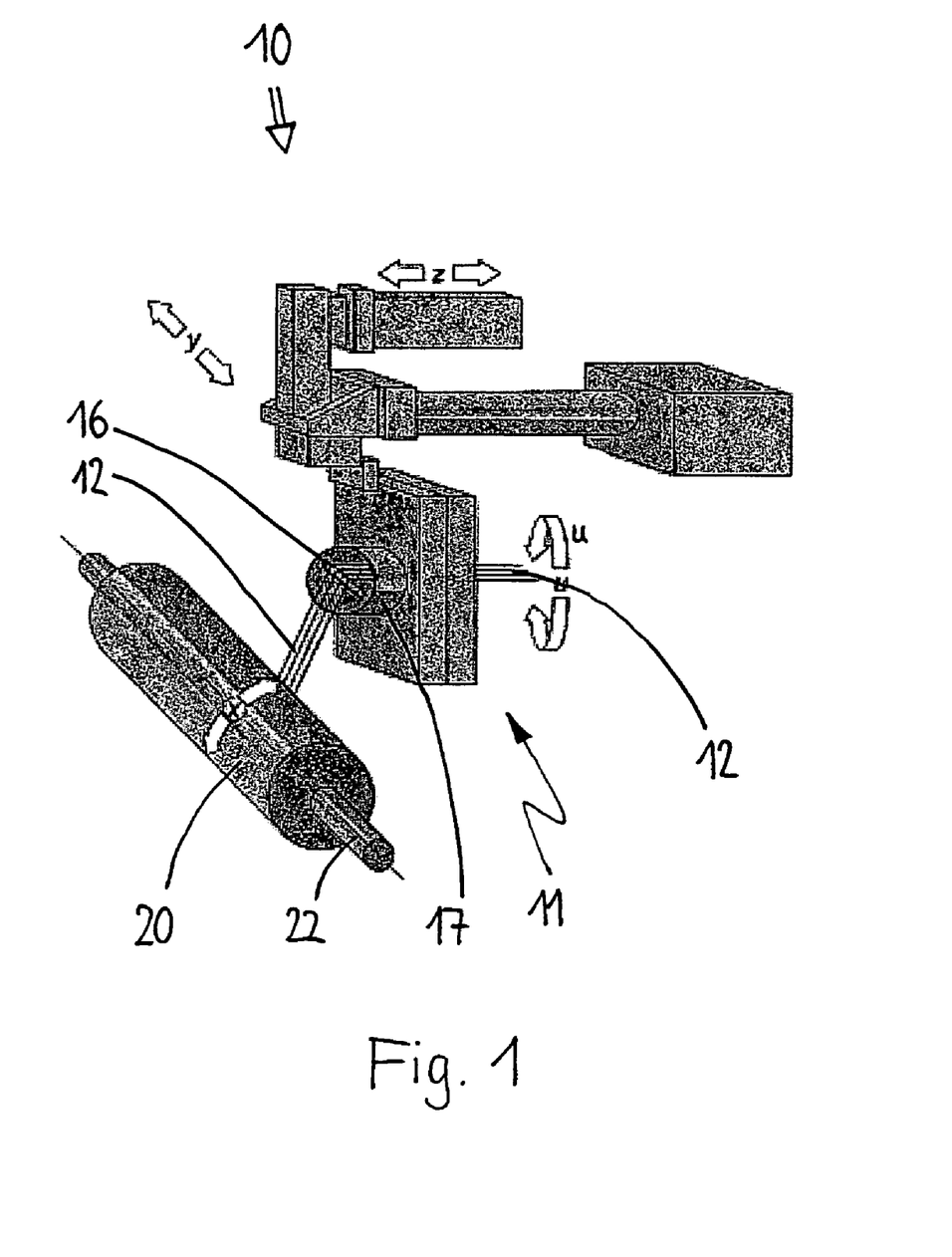
FIG. 1 a strongly simplified schematic view of a filament winding installation.

The system according to the invention is used in a filament winding installation 10 as schematically represented in FIG. 1 which may comprise a CNC-controlled single-spindle or multi-spindle lathe realized as a portal machine or a vertical machine and which may have drives to activate base elements 20 to be wound and a feeding device 11 for a fiber strand 12. The moving directions of the units and the components are illustrated by arrows. The axes of motion are referred to as x, y, z and u.

In the example described here, the base element 20 is a blow-moulded plastic cylinder 22 having curved ends and/or polar caps 24, one of them being provided with an intake or filler neck.

The fiber strand 12 may be a glass fiber tape consisting of 8 rovings with 1,200 tex each, for example. It is fed through an impregnation bath (not shown) where it is impregnated with resin, e.g. in a dipping infiltration process, and it finally reaches the base element 20 via a spool creel (not shown, either). A payout eye 16 at the end of a CNC-controlled traversing arm 17 leads the fiber strand 12 over the base element 20, with the drive shaft and the drive of the traversing arm 17 being synchronously controlled for regular winding.

Particularly efficient is a combination (not represented) of two filament winding installations 10 of like types having lathes with ten spindles, namely two groups with 5 spindles each on the lefthand and on the righthand side of a common drive 18. For example, the 5 spindles of the one group continuously produce with a predefined cycle time, whereas the other spindle group is unloaded and fed again by robots. For this purpose, a conveyor system (not shown, either) provides raw vessels which are clamped onto the spindles of each lathe.

After termination of the winding operation, the fiber strand 12 coming from the impregnation bath (not shown) is picked up by the separating and binding system, cut off from the completed wound package 70 and linked with a new base element 20. Sensors (not shown) determine the winding progress so that a signal for cutting the fiber strand 12 is produced at the end of a winding operation, followed by a second signal for linking the thus separated fiber strand 12 with the next base element 20. When the completed wound package 70 has been removed, it is cured in a drying oven (not shown).

To cut off the fiber strands 12 from the completed wound package 70, a separating device 30 is provided (see FIG. 2), suited to pick up the whole fiber strand 12 by means of a gripping and fixing device 40 and to cut the clamped fiber strands 12 by means of a cutting device 45. For this purpose, the gripping and fixing device 40 is provided with a pneumatic cylinder 41 that is a drive for two gripping jaws 42 suited to fix the fiber strands 12 between them. The clamping force generated between the gripping jaws 42 is rated so as to allow the system to easily resist the tensile load of up to 30 kg exerted by the fiber strands 12. The cutting device 45 includes a blade 46 suited to be linearly driven by a pneumatic centering actuator 48 for cutting the fiber strands 12.

Figure 2:
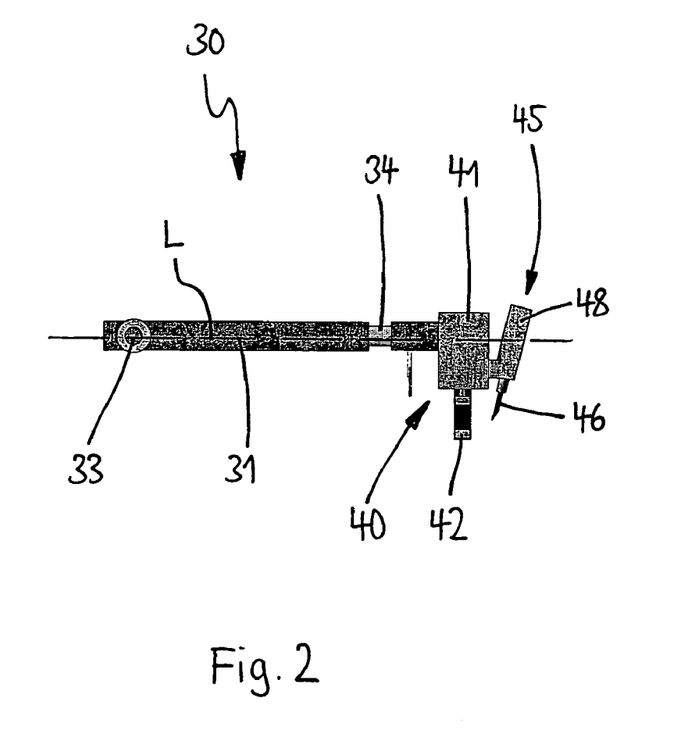
FIG. 2 a schematic lateral view of a separating device of a system for separating and linking fiber strands, FIG. 3 a schematic view of a binding device of a system for separating and linking fiber strands, FIG. 4 a front view and a lateral view of the system for separating and linking fiber strands during a winding operation, FIG. 5 the system of FIG. 4 after the winding operation with the separating device in its home position, FIG. 6 a front view of the wound package of FIG. 5 after the fiber strand has been cut, FIG. 7 a front view of the wound package of FIG. 5 while the package-sided end of the fiber strand is positioned and/or spread on it, FIG. 8 a partial top view of a filament winding installation with a feeding device in two different positions, FIG. 9 a front view of a non-wound plastic cylinder during positioning of the separating device, FIG. 10 a front view of the plastic cylinder of FIG. 9 while the fiber strand is passed from the separating device to the binding device, FIG. 11 a lateral view of a binding device and FIG. 12 a lateral view of a separating device.

The whole separating device 30 is fixed on the feeding device 11 of the filament winding installation 10 by means of a supporting arm 31 or supporting frame on whose end the gripping device 40 and the cutting device 45 are mounted. A lower joint 33 situated in front of the feeding device 11 allows the separating device to pivot in a plane perpendicular to the drive shaft 22 of the base element 20, whereas an upper joint 34 permits pivoting of the gripping device 40 and the cutting device 45 around the longitudinal axis L of the supporting arm 31.

Figure 3:
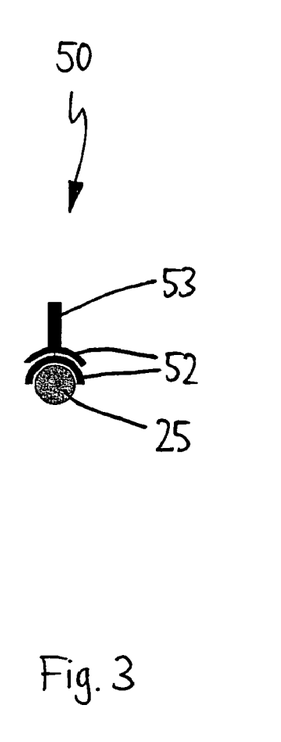

Attaching the cut fiber strand 12 to a new base element 20 is realized by means of a binding device 50 of which a much simplified illustration is seen in FIG. 3. In a non-contact arrangement above the drive shaft 25 of the base element 20, the binding device 50 is immediately adjacent to a polar cap 24 of the plastic cylinder 22 and comprises two curved clamping jaws 52 in order to pick up and fix the fiber strand 12. The clamping jaws 52 are opened and closed by means of a lever 53 operated a pneumatic actuating cylinder 54 (not shown here).

Figure 4:
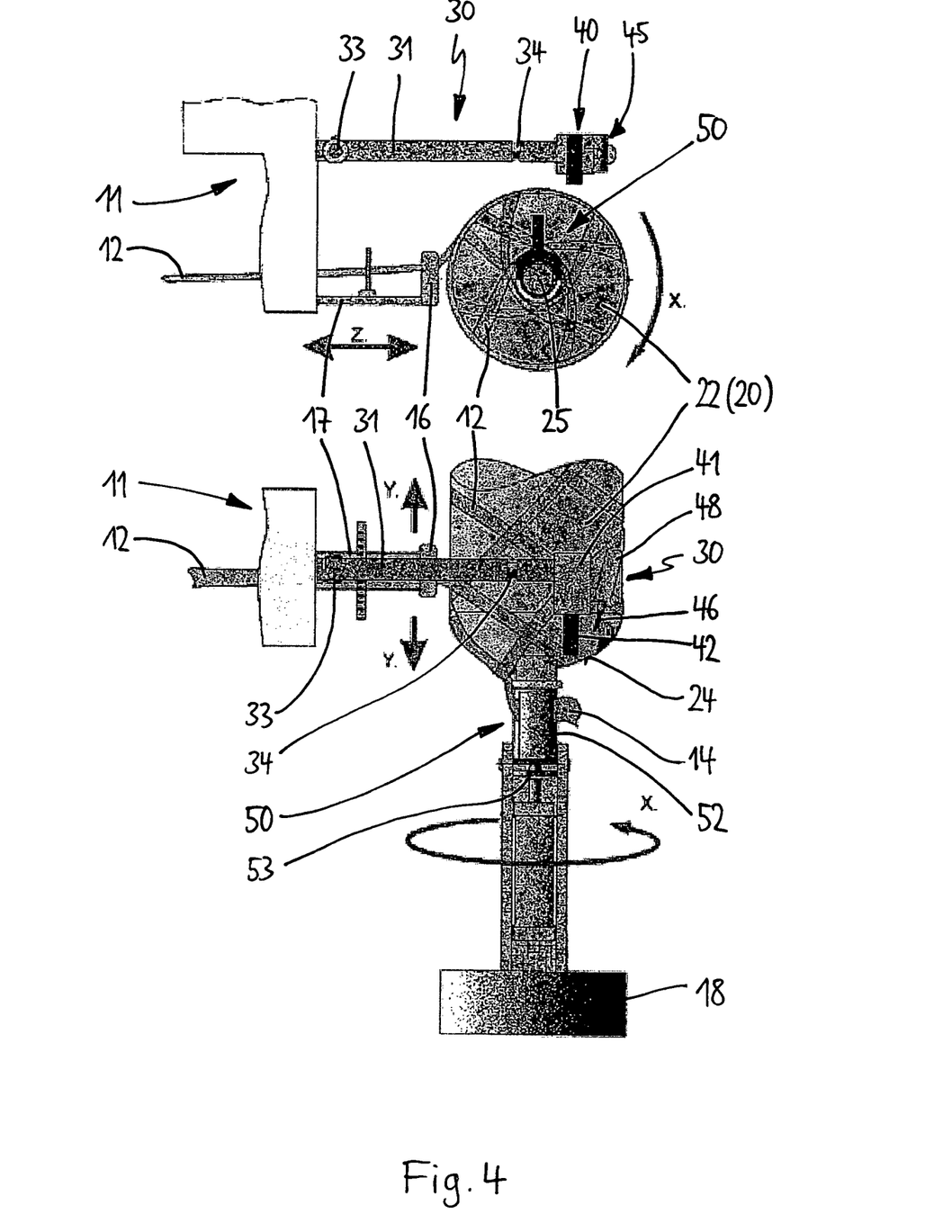

FIG. 4 shows the means for separating and linking fiber strands 12 together with its system components, viz. the separating device 30 and the binding device 50. Both are illustrated in the positions which they occupy during the winding process. The separating device 30 is borne by the feeding device 11 above the plastic cylinder 22, whereas the binding device 50 is positioned in front of the polar cap 24.

The winding operation may, for example, take approximately 8 min. It is terminated by some radial turns made with little feed so that the fiber strand 12 ends at an angle of 90 degrees relative to the axis of the mandrel 25, preferably in the longitudinal center of the plastic cylinder 22 or the completed wound package 70 (see FIG. 5).

Figure 5:
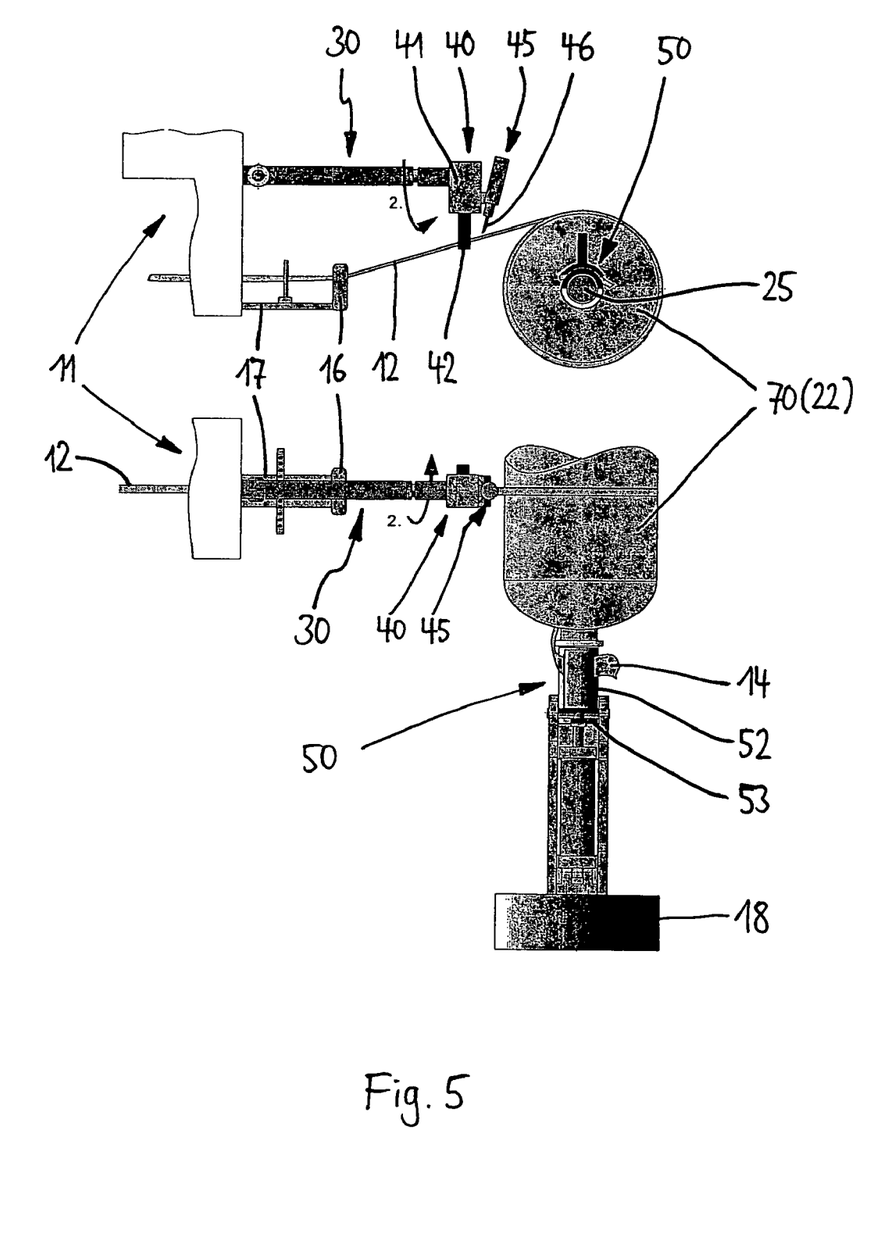

For separating the completed wound package 70 from the fiber strand 12, the feeding device 11 together with the separating device 30 travels back a certain distance along the z-axis until the gripping device 40 and the cutting device 45 are beside the wound package 70. From that position, they are pivoted by means of the upper joint 34 by approximately 90° and brought into their operative position, the gripping device 40 being out of contact above the fiber strand 12 with its gripping jaws 42 opened to prevent damages to the filaments and inadvertent stripping of resin.

It will be seen that the fiber strand 12, looked at from above, is a straight tape having a width of 3.5 cm, for example, which is picked up by closing the gripping jaws 42 and is kept in that position in a non-positive manner by the gripping device 40. Thus the latter also acts as a fixing device for the fiber strand 12 which can then be cut by the cutting device 45. In that process step, the high tensile stress of the rovings 12 is absorbed by the gripping device 40 and thus by the separating device 30.

Figure 6:
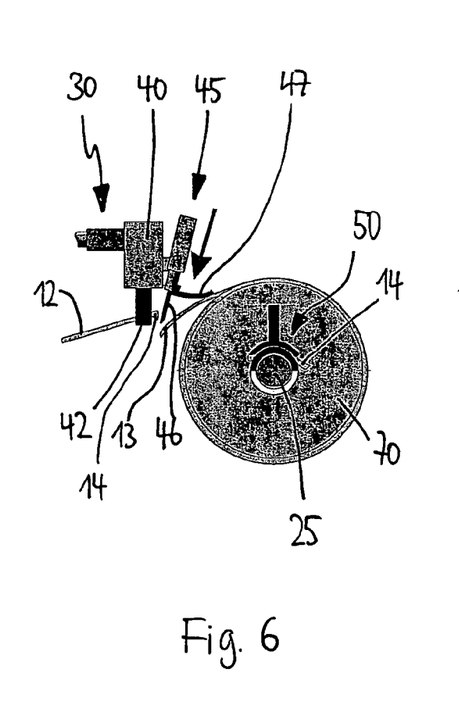
Figure 7:
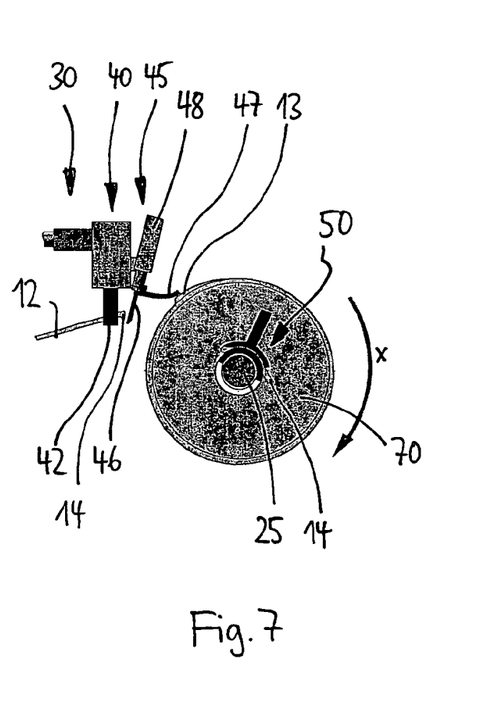

The cutting stage is illustrated in FIG. 6. The blade 46 moves into the fiber strand 12 and cuts the individual rovings. The fiber strand now has a package-sided end 13, whereas the remaining fiber strand 12 remains firmly fixed in the gripping device 40. As evident from FIG. 7, the package-sided end 13 of the fiber strand is applied flat against the wound package 70 by an elastic stripper as the blade 46 moves in. The stripper 47 is preferably a rubber lip or plastic lip fixed on a cutter bar (not specified). After the cutting operation with the blade 46, said cutter bar is kept in the lower position for a short time, while the spindle shaft (x-axis) rotates the wound package 22/70 by, say, 2 further turns for evenly fixing the end 13. Subsequently, the blade 46 returns into its initial position.

Figure 8:
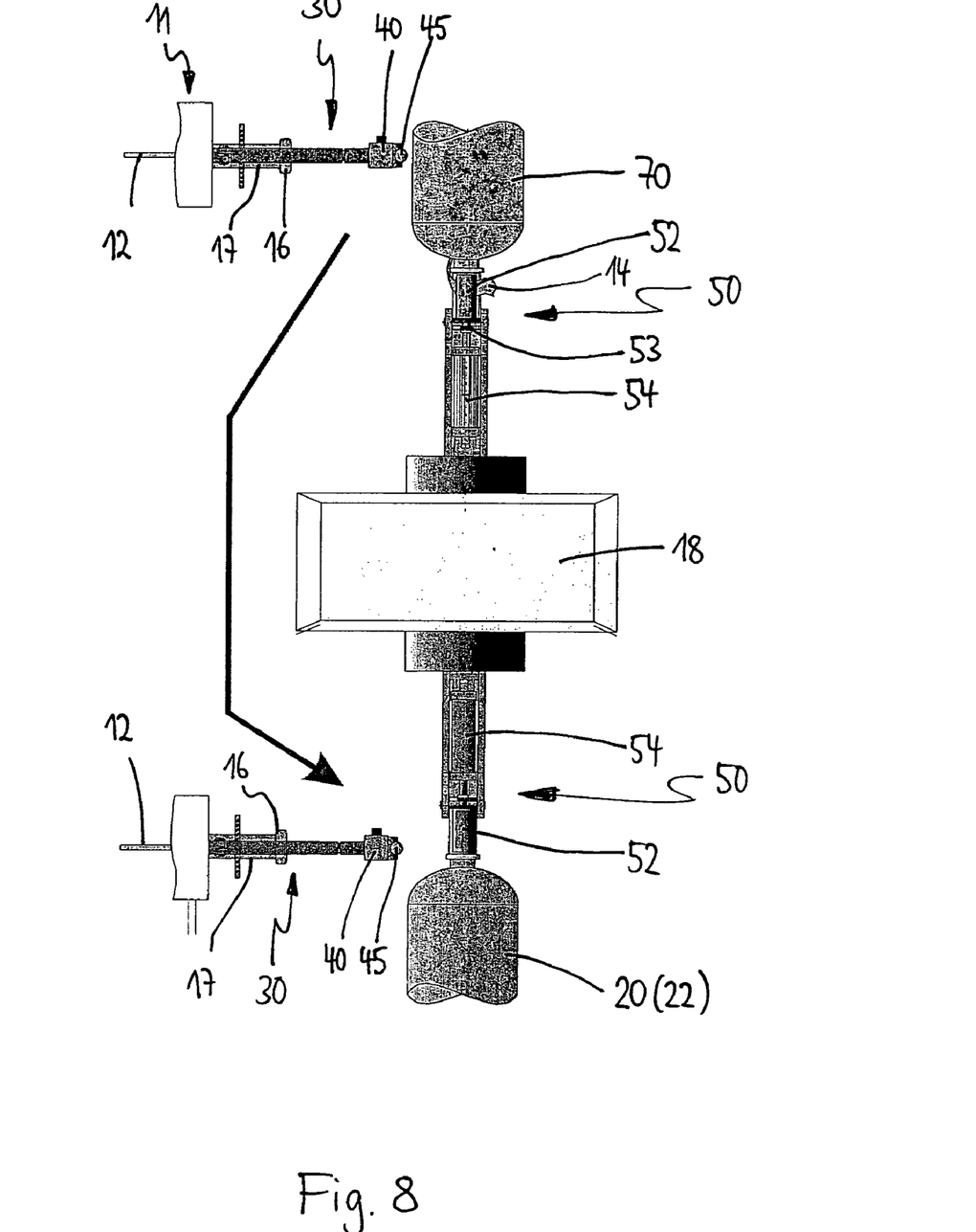

To remove the completed wound package 70, the following work step comprises a cross movement of the fiber strand 12, i. e. in y-direction (see FIG. 8). Now the traversing arm 17 together with the payout eye 16 and the separating device 30 are moved from one side to the other of the filament winding installation 10 and its drive support, respectively, where a new plastic cylinder 22 is ready. There, the free end 14 of the cut fiber strand 12 which is still held by the separating device 30 is positioned by the feeding device 11 above the binding device 50 which is still closed (see FIG. 9).

Figure 9:
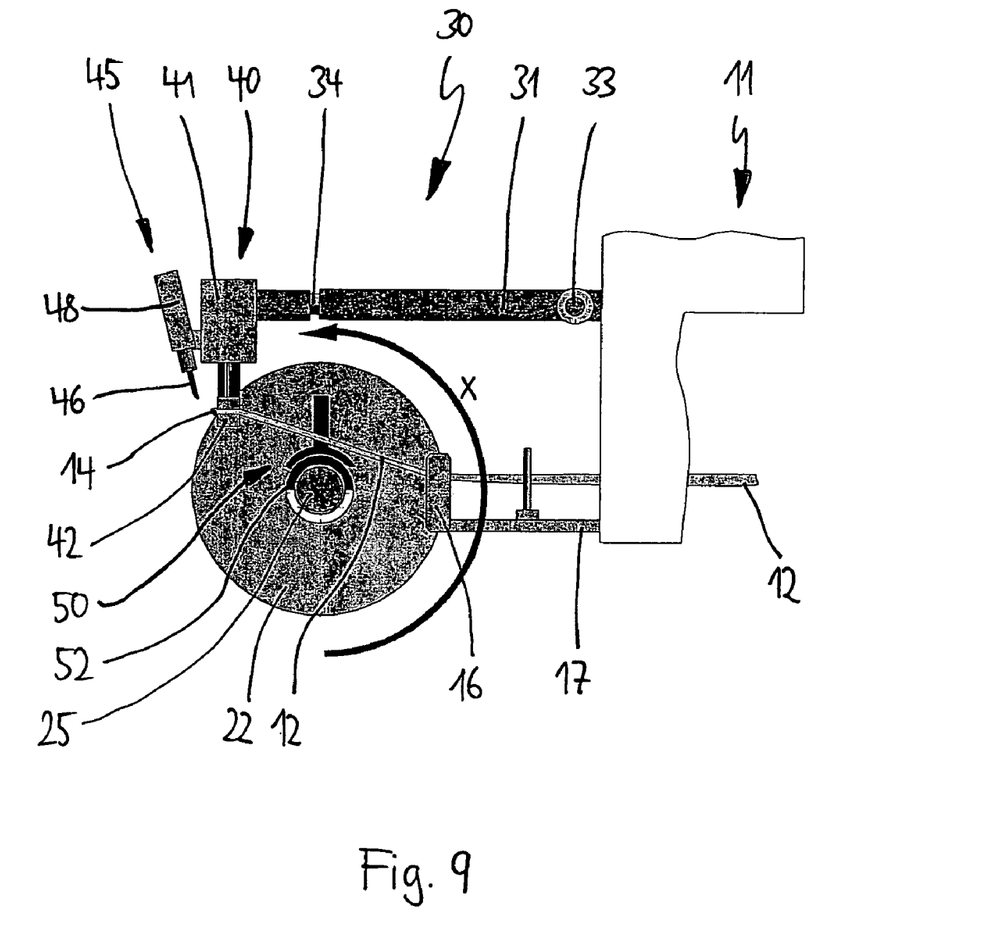

After opening of the clamping jaws 52 by means of the actuating cylinder 54, the fiber strand 12 is introduced with clearances into the binding device 50 by the feeding device 11 and the separating device 30. Subsequently the clamping jaws 52 are closed, with the end 14 of the fiber strand being fixed by the binding device 50 in a non-positive manner.

Figure 10:
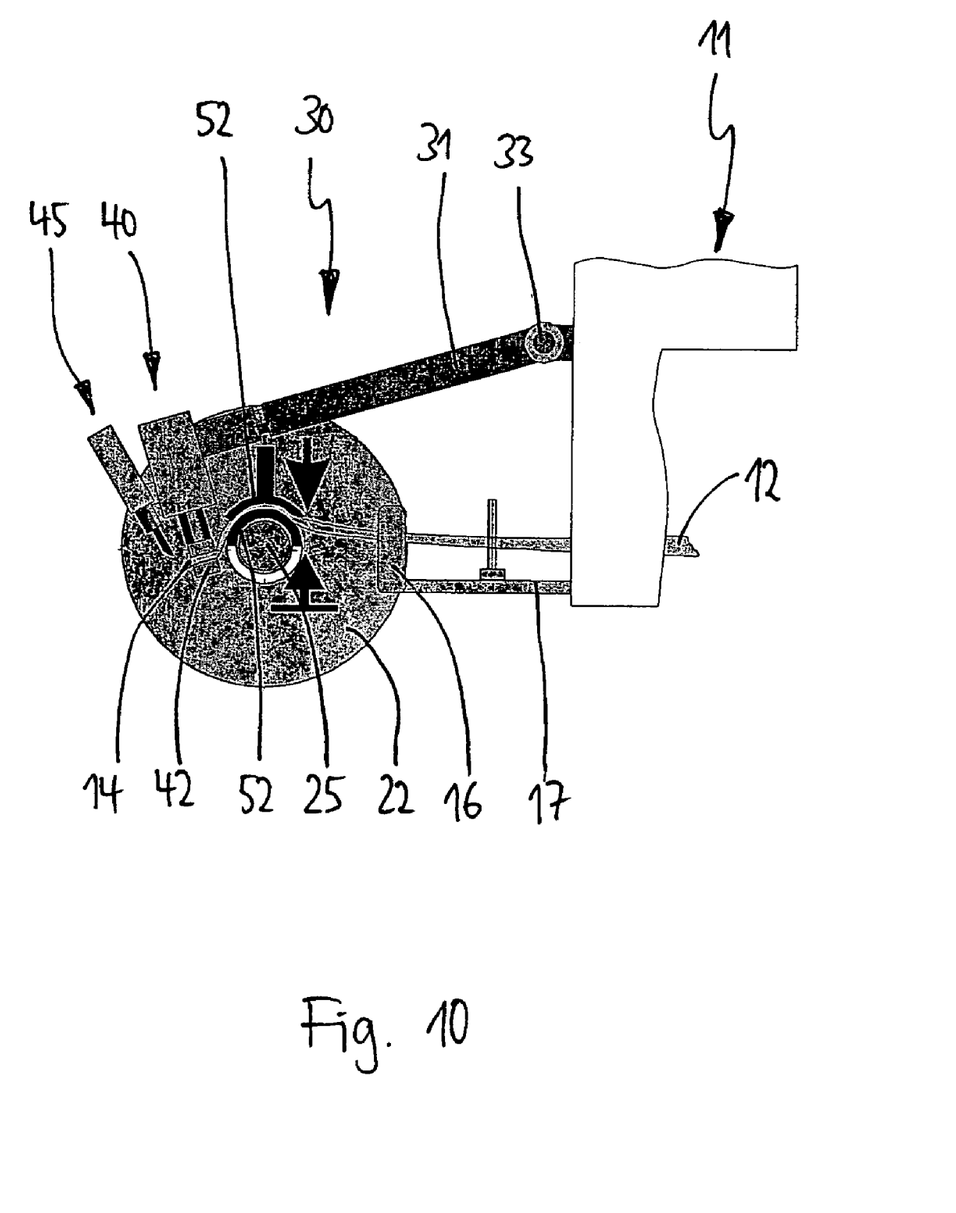

To avoid undesired overrun of the free end 14 caused by immediate closing of the clamping jaws 52, the separating device is tilted downwards—as shown in FIG. 10—by means of the joint 33 integrated in the supporting arm 31 whereby the free end is kept short.

Once the end 14 of the fiber strand is clenched in the clamping jaws 52, the gripping jaws 42 of the gripping device 40 open up for release of the fiber strand 12. The separating device 30 is then pivoted by means of the joints 33 and 34 out of the working zone and is swung back into its initial position (see FIG. 4).

Now the system is in the initial position, ready to start a new winding operation. Initially, the winding shaft (x-axis) rotates synchronously with the feeding device 11 which positions the payout eye 16 and the separating device 30 in the y- and z-directions. At first the rovings 12 obstruct the path from the payout eye 16 to the tangent of the polar cap 24, but after few rotations of the plastic cylinder 22, the fiber strand 12 covers that rovings triangle (see FIG. 4). Thereafter, the adhesion of the first winding will suffice to relieve the clamping jaws 52 of the binding device 50, whereby the winding operation will continue without any impediment.

While the new plastic cylinder 22 is being wound, the already completed wound package 70 on the other side of the filament winding installation 10 can be removed and be replaced by a new base element 20.

It will be noted that the system for separating and linking composite fibers, fiber bundles, etc. is designed to provide the following functions and units:

B1 "separating" including the functions "fixing the fiber strand" by "gripping and clamping" as well as "separating the fiber strand" and "transporting the fiber strand";

B2 "binding" by "passing the fiber strand" and "binding the fiber strand";

B3 "drives" for the afore-mentioned units; and

B4 "kinematics" for the processes of the units 1) and 2).

Separating devices 45 having a long service life of at least 23 hours and a low height, particularly less than 200 mm, are required to cut fiber strands 12 of e.g. up to eight rovings with up to 2,400 tex each. For a blade 46, use is therefore preferably made of shear bars gliding past one another, of a blade pressed against a pad, or of 2 cutters orientated at an acute angle to one another for cutting the rovings by a relative movement generated by the actuating cylinder 42, with the fiber strand 12 being automatically centered. Alternatively, a rotating scalpel may be used, or the fiber strands 12 are cut by sawing.

Various gripping and clamping systems may also be used for the fixing procedures in the units B1 and B2. For the gripping device 40 of the separating device 30, use is preferably made of a pneumatic parallel gripper or of two parallel surface jaws adapted to be pressed against one another. The binding device 50 preferably comprises two semi-shells suited to be pressed against one another. In that case, important selection criteria are the overall installed size and the required space, respectively, as well as the operational reliability. However, the price plays a significant role, too. Therefore, self-locking fixing devices may also be taken into consideration.

The efficiency of gripping and clamping devices is significantly determined by their surface textures and will depend on the form and geometry as well as the roughness and grip, respectively, of the gripping and clamping jaws. For that reason, the gripping jaws 42 of the gripping device 40 are preferably rectangular and flat, and comprise smooth gripping jaw surfaces which makes them easy to manufacture. Variations may include wedge-shaped or roof-shaped jaws. Alternatively, the surfaces may be provided with dimpled rubber or cellular rubber. The binding unit comprises curved jaws, in particular semicircular ones. The combination of the two basic materials Teflon and metal may also be advantageous, with the resin-containing areas having jagged grooves. Using knurled jaws made of metal and/or Teflon allows to pick up the rovings 12 gently.

Conventional roller bearings and sliding bearings are suited to support the mobile components, preferably free of grease and without any gaskets. It should be prevented that resin dissolved in acetone could creep under the gaskets, e.g. during cleaning the filament winding installations, so open bearings are preferred since they are easily scavenged.

As to the unit B3, filament winding installations generally comprise electric and/or pneumatic drives. Therefore, the system according to the invention is also provided with such drives in view of their efficiency and reliability.

The kinematic structure (unit B4) must be designed in such a way that the separating/binding system 30, 50 is not within the diameter of the winding core while the fiber strand is wound but that the system may be moved towards the mandrel axis 25. Consequently, the inclinable separating device 30 is always behind the mandrel. However, it is also contemplated that a central control rod (not shown) moves the separating device 30 and/or the binding device 50 up and down.

Preferably, however, the latter will directly engage the polar cap 24 of the mandrel or the wound package 20, respectively, or it will centrically rotate around it.

Figure 11:
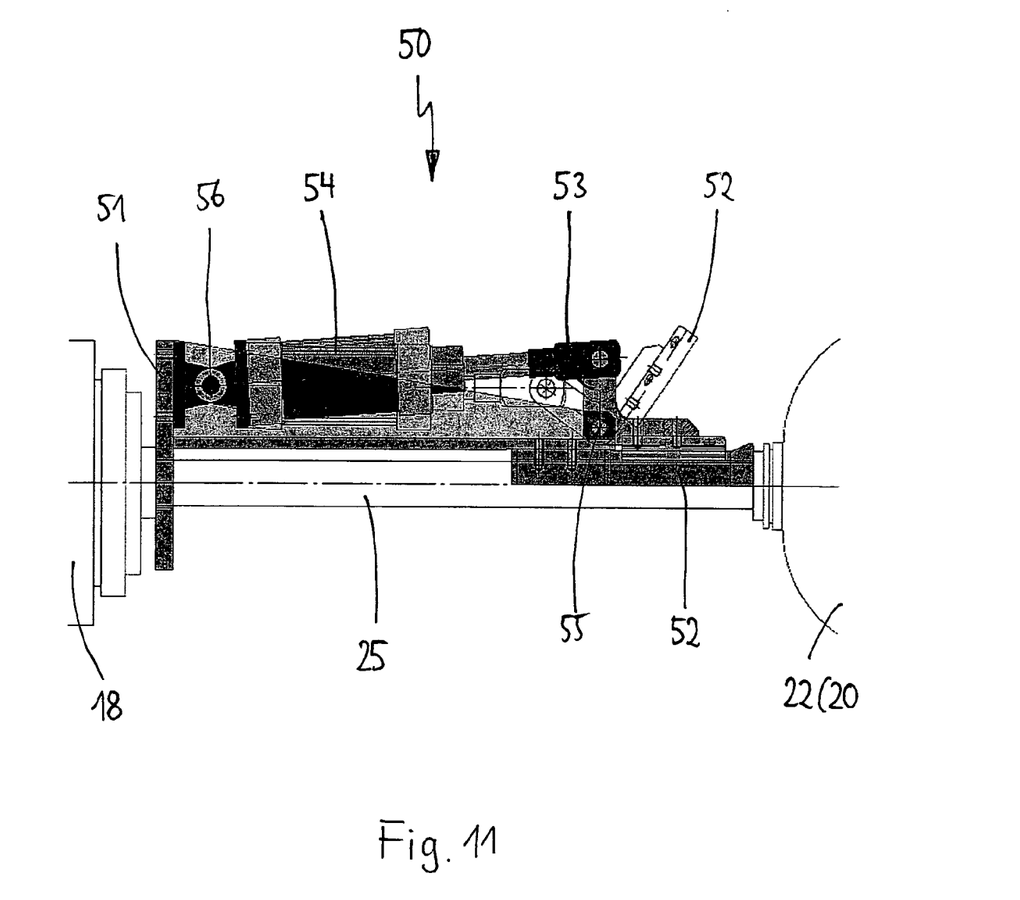
Figure 12:
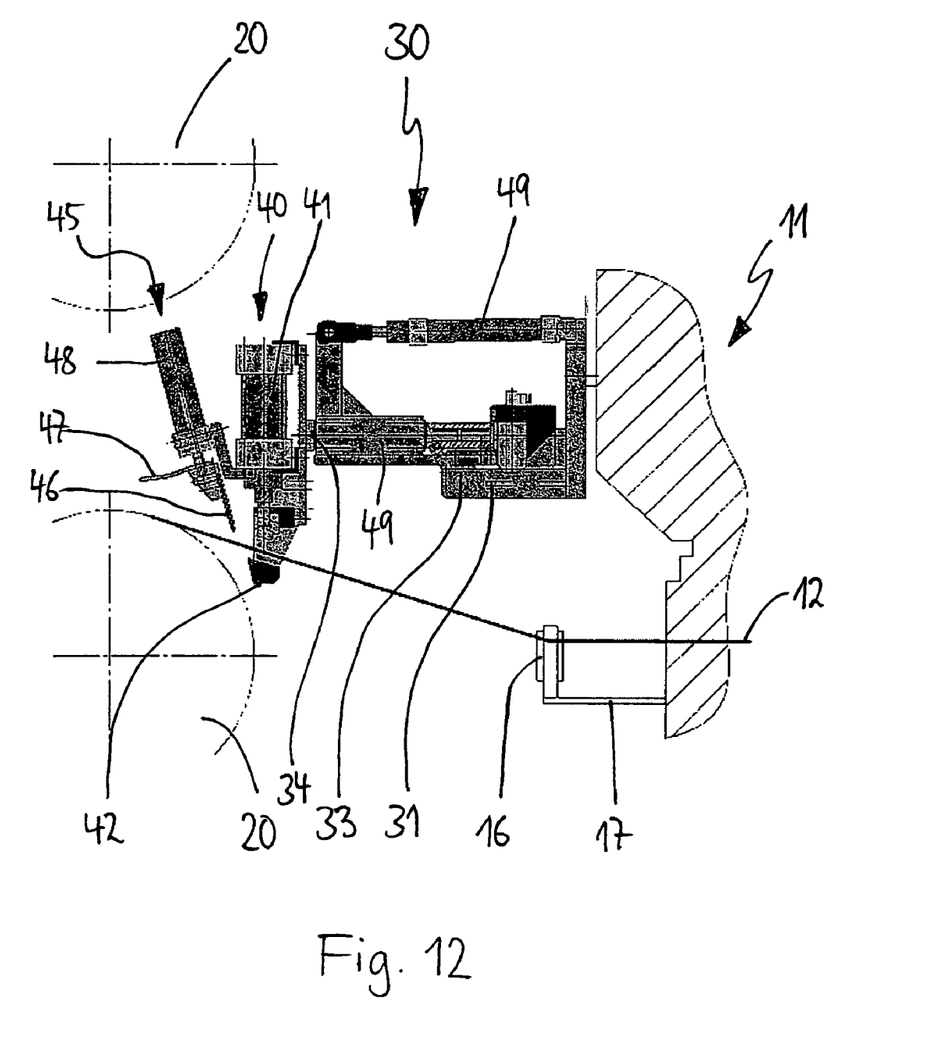

Another embodiment of the invention will be evident from FIGS. 11 and 12. The binding device 50 is fixed to a chuck of a lathe (not drawn in detail) by means of a base plate 51. The upper clamping jaw 52 is actuated via an angle lever 53 arranged in a shaft 55 by the pneumatic cylinder 54 which is likewise pivotable around a shaft 56 in order to permit balancing movements. The lower clamping jaw 52 is fixed.

In a lateral view, the separating device 30 is drawn in its position before the cut. The movements of the gripping device 40 and the cutting device 45 around the swivelling and rotation joints 33, 34 are realized by pneumatic drives 49 connected with the compressed air supply unit of the system via solenoid valves (not visible).

Tests of the system according to the invention have shown that the gripping mechanisms 40, 50 perfectly picked up all rovings. Only on dry, not yet impregnated fiber strands 12, some individual filaments were pulled out of the gripping device when exposed to high tensile stress, whereas the impregnated fiber strand 12 retained all the filaments. Neither clamping nor cutting the rovings caused any soiling due to escaping resin, and all cutting operations were realized by an impeccable clear cut. When the separating device 30 pivoted into the working zone, the fiber strand 12 was never touched, i.e. there was no contact, and it was transmitted from the separating device to the binding device (that is from 30 to 50) without any trouble at all so that the next winding operation was properly executed, too, even at a winding speed of 60 m/min.

Yet another embodiment of the invention comprises the following process steps:

a) After completion of a wound product, a separating and binding device located on the filament winding system is brought into its operative position, for example by pivoting, in which position the separating device 30 and the binding device 50 are combined. Thus the combined separating and binding unit does not any more include clamping jaws 52 arranged on the polar caps 24, but has only a gripping device 40 provided with gripping jaws 42;

b) fibers extending from the completed wound product are picked up and clamped by the gripping device without the fibers of the fiber strand losing their preliminary tension;

c) a fixed blade or a driven knife cuts the fibers between the product and the gripping device;

d) the thus cut fibers projecting from the product are smoothed onto it by means of a stripper used, in particular, for rubbing them on;

e) the completed product is removed, and the separating device is moved to an adjacent new base element, the gripping device still clamping the fiber strand at a portion in front of its free end so that the production process is continued without any interruptions or manual interventions;

f) resin remainders that may stick on the stripper of the separating and binding unit are stripped off and distributed onto the surface of a new non-wound base element (e. g. on a plastic vessel);

g) the fiber strand clamped in the gripping device is deposited in the resin on the surface of the new base element;

h) by synchronized opening of the gripping device and defined turning of the new base element in reverse direction by a given angle, the free end of the fiber strand is fixed onto the surface of the new base element, preferably by means of a further stripper, e. g. a lip sliding over the free end of the fiber strand in the direction of the fibers;

i) once the direction of rotation has changed, the free end of the fiber strand is looped by at least one turn in winding direction around the base element without fiber tension, and that can be facilitated by a lip which slides over the surface and the fibers;

j) after the initial fixing, the separating and binding unit is swung out from the working zone by pivoting so that the actual winding process can be started;

k) when that winding process is terminated, the next cycle starts beginning with process step a).

The invention is not limited to any of the embodiments described above, but may be modified in variegated ways. It will be seen that in a filament winding installation 10, an impregnated fiber strand 12 is wound on a base element 20 driven in rotation. A separating device 30 is used for cutting the end 13 of the fiber strand 12 and applying it on a completed wound package 70. A binding device 50 passes the free end 14 of the fiber strand 12 to the next base element 20, preferably near the polar caps 24. An elastic stripper 47 is associated to a blade 46 of a cutting device 45 for movement along the periphery of the wound package 70 more or less perpendicularly to the cutting direction. The separating device 30 is pivotable into and out of the filament installation working zone, optionally as a module with the binding device 50. The movement of the wound package 70 is synchronously coupled with the separating device 30. In cutting position, the fiber strand 12 can be fixed by means of a gripping device 40 which is adapted to be swung into and out of the filament winding installation working zone, preferably in combination with the cutting device 45.

All the features and advantages disclosed in the claims, the description and the drawings, including design details, spatial arrangements and process steps, may be essential to the invention, both individually and in a great variety of combinations.

IDENTIFICATION REFERENCES

L longitudinal axis
10 filament winding installation
11 feeding device
12 fiber strand
13 package-sided fiber strand end
14 free end of the fiber strand
16 payout eye
17 traversing arm
18 winding drive
20 base element/wound package
22 plastic cylinder
24 polar cap
25 mandrel
30 separating device
31 supporting arm
33 lower joint
34 upper joint
40 gripping device
41 cylinder
42 gripping jaw
45 cutting device
46 blade
47 stripper
48 cylinder
49 pressure cylinder
50 binding device
51 base plate
52 clamping jaws
53 lever
54 actuating cylinder
55 shaft
56 shaft
70 wound product

The invention claimed is:

1. System for separating and linking composite fibers, fiber bundles and the like in a filament winding installation (10) for a manufacture of rotationally symmetric completed wound packages (70), provided with a feeding device (11) for a fiber strand (12) impregnated with a matrix material which is wound on a base element (20) driven in rotation, comprising at least one separating device (30) for cutting the fiber strand (12) and contacting a package-sided end (13) of the fiber strand (12) on the completed wound package (70) and at least one binding device (50) for linking a free end (14) of the fiber strand (12) with an adjacent new non-wound base element (20), wherein the separating device (30) and the binding device (50) are pivotable into and out of a working zone of the filament winding installation.

2. System according to claim 1, wherein the separating device (30) comprises at least one cutting device (45).

3. System according to claim 1, wherein the separating device (30) comprises at least one elastic stripper (47), for example in form of a rubber lip or plastic lip which is moved and guided onto a peripheral side of the wound package during linking of a separated end of the fibers.

4. System according to claim 3, wherein the stripper (47) is arranged more or less perpendicular relative to a cutting direction of the cutting device (45).

5. System according to claim 3, wherein movement of the cutting device (45) and the stripper (47) is synchronously coupled with a movement of the wound package (20).

6. System according to claim 1, wherein the separating and binding devices (30, 50) form a module.

7. System according to claim 1, wherein the binding device (50) is associated with the separating device (30) in a manner which allows pivoting relative to each other.

8. System according to claim 1, wherein the binding device (50) comprises at least one further elastic stripper, for example by way of a rubber lip or a plastic lip adapted to be applied onto a periphery of the wound package (20).

9. System according to claim 8, wherein a movement of the further stripper is synchronously coupled with a movement of the wound package (20).

10. System according to claim 9, wherein a gripping device (40) is provided for fixing the fiber strand (12) before it is cut.

11. System according to claim 9, wherein a gripping device (40) is pivotable into and out of the working zone of the filament winding installation (10).

12. System according to claim 10, wherein the gripping device (40) forms a module with the separating device (30) and/or the binding device (50).

* * * * *